United States Patent
Ii

(10) Patent No.: US 12,336,601 B2
(45) Date of Patent: Jun. 24, 2025

(54) SLIDE FASTENER ELEMENT WITH DECORATION BEARING PORTION

(71) Applicant: YKK Corporation, Tokyo (JP)

(72) Inventor: Haruaki Ii, Milan (IT)

(73) Assignee: YKK Corporation, Tokyo (JP)

( * ) Notice: Subject to any disclaimer, the term of this patent is extended or adjusted under 35 U.S.C. 154(b) by 0 days.

(21) Appl. No.: 18/463,712

(22) Filed: Sep. 8, 2023

(65) Prior Publication Data

US 2024/0081491 A1 Mar. 14, 2024

(30) Foreign Application Priority Data

Sep. 12, 2022 (IT) ........................ 102022000018486

(51) Int. Cl.
*A44B 19/26* (2006.01)
*A44B 19/34* (2006.01)

(52) U.S. Cl.
CPC ............ *A44B 19/262* (2013.01); *A44B 19/34* (2013.01)

(58) Field of Classification Search
CPC ..... A44B 19/262; A44B 19/34; A44B 19/403; A44B 19/02; A44B 19/24; B29L 2005/00; B29C 45/2673; B22D 17/16; B22D 17/22
See application file for complete search history.

(56) References Cited

U.S. PATENT DOCUMENTS

| | | | | |
|---|---|---|---|---|
| 2,060,830 A | * | 11/1936 | Silberman | A44B 19/403 D11/221 |
| 3,643,297 A | * | 2/1972 | Urban | A44B 19/403 24/414 |
| 3,885,275 A | * | 5/1975 | Hasegawa | A44B 19/34 24/414 |
| 4,040,150 A | * | 8/1977 | Fukuroi | A44B 19/06 24/410 |
| D252,896 S | * | 9/1979 | Jovin | 24/410 |
| 4,520,535 A | * | 6/1985 | Kasai | A44B 19/06 24/410 |

(Continued)

FOREIGN PATENT DOCUMENTS

| CN | 107373914 A | 11/2017 |
|---|---|---|
| CN | 207011823 U | 2/2018 |

(Continued)

OTHER PUBLICATIONS

Search Report, Italian Patent Application No. 102022000018486, Apr. 12, 2023, 8 pages.

*Primary Examiner* — David M Upchurch
(74) *Attorney, Agent, or Firm* — Kilpatrick Townsend & Stockton LLP

(57) ABSTRACT

A fastener element for a slide fastener includes: a head portion forming at least one coupling protrusion, and at least one receiving area configured for receiving, in a closed condition of the slide fastener, a coupling protrusion of an adjacent fastener element. A first leg and a second leg extend from the head portion. Each leg forms a respective proximal portion where each leg joins the head portion, and a distal portion extending away from the proximal portion to a free end of the respective leg. A decoration bearing portion is formed with the second leg on an outer side thereof. A connecting portion is located on the distal portion of the second leg and integrally connects the decoration bearing portion to the second leg.

11 Claims, 7 Drawing Sheets

(56) References Cited

U.S. PATENT DOCUMENTS

| | | | | |
|---|---|---|---|---|
| 4,587,694 | A * | 5/1986 | Asahi | A44B 19/36 24/435 |
| 2003/0192150 | A1* | 10/2003 | Aoki | A44B 19/06 24/403 |
| 2011/0302749 | A1* | 12/2011 | Yazbeck | A44B 19/24 24/405 |
| 2013/0019442 | A1* | 1/2013 | Yamakita | A44B 19/06 24/431 |
| 2015/0121663 | A1* | 5/2015 | Himi | A44B 19/04 156/245 |
| 2020/0085150 | A1* | 3/2020 | Kikukawa | C25D 7/02 |

FOREIGN PATENT DOCUMENTS

| | | | |
|---|---|---|---|
| WO | 2012-140431 | A1 | 10/2012 |
| WO | 2021-016914 | A1 | 2/2021 |

* cited by examiner

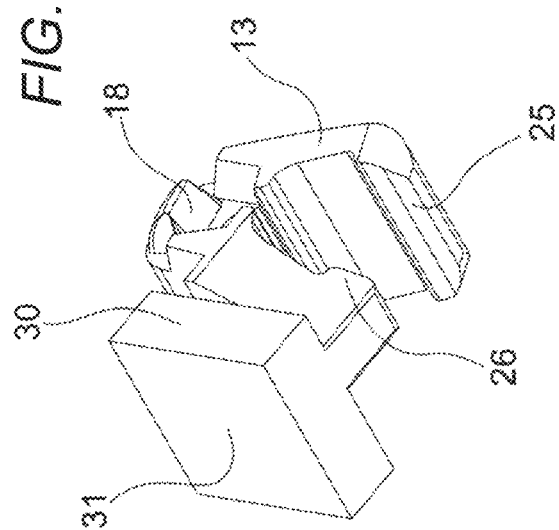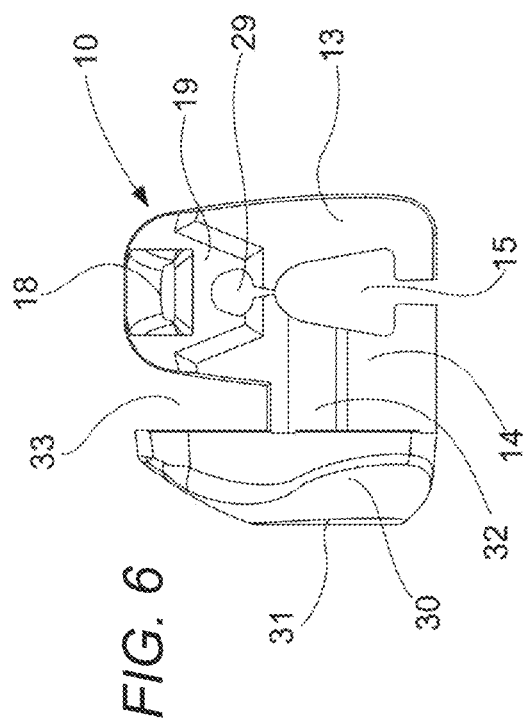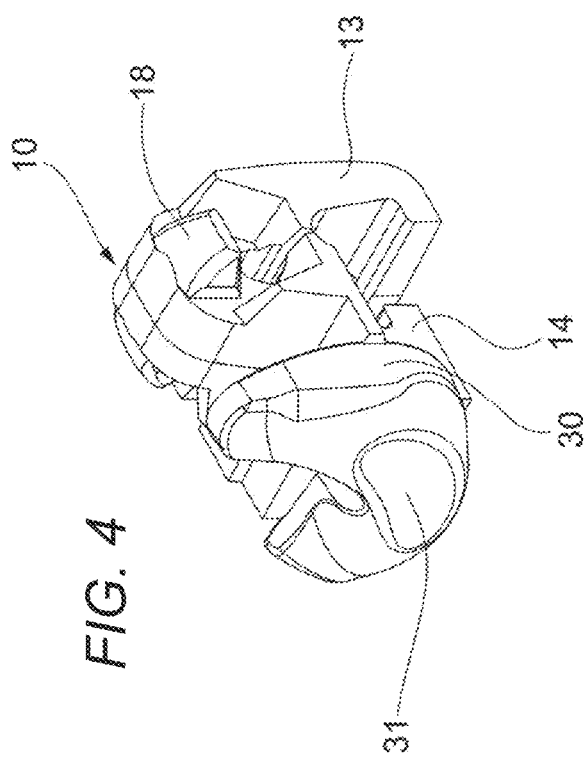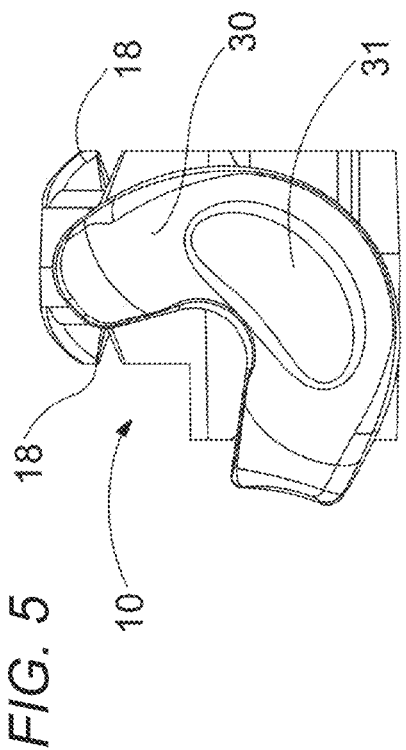

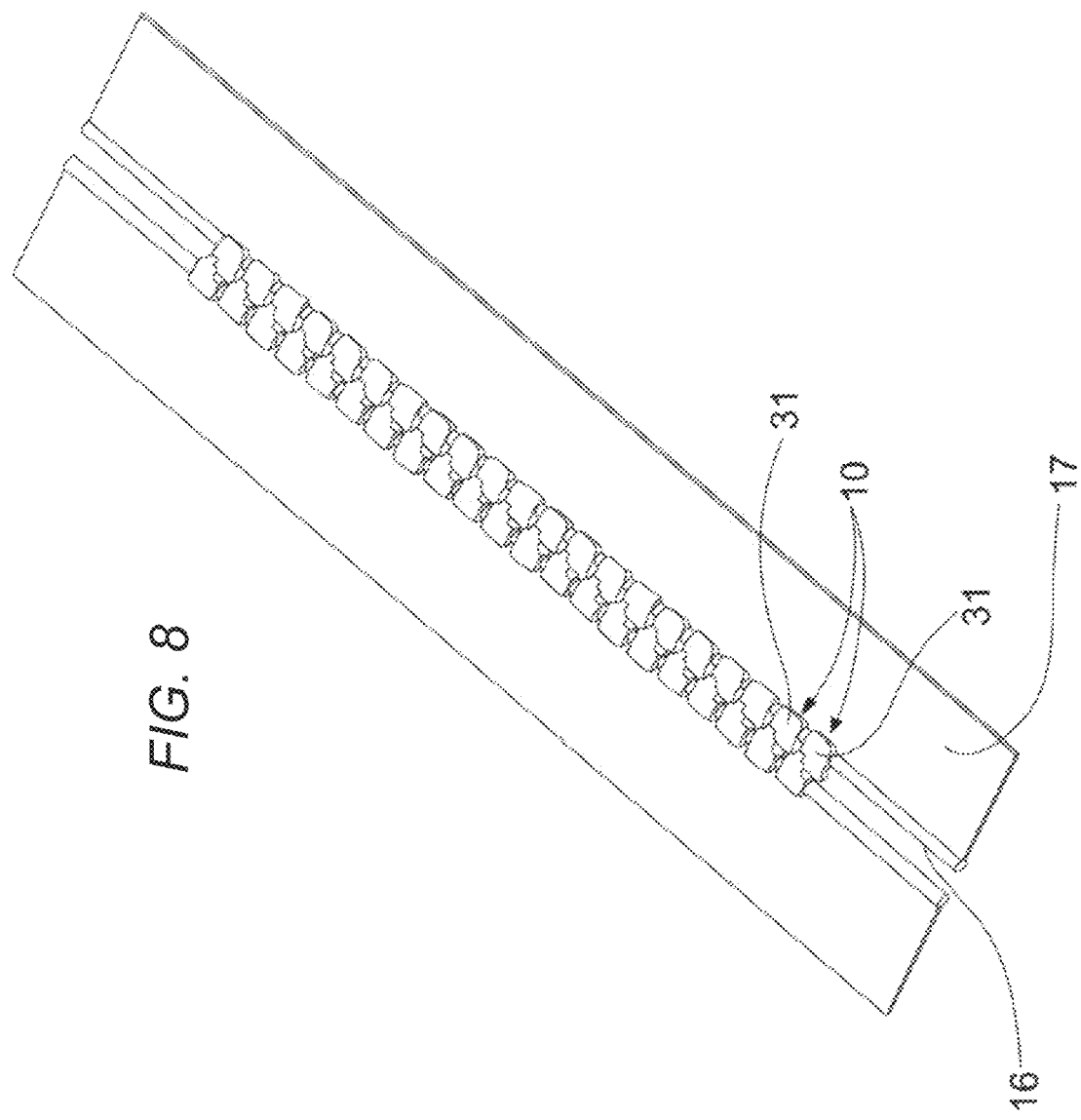

SLIDE FASTENER ELEMENT WITH DECORATION BEARING PORTION

CROSS-REFERENCE TO RELATED APPLICATIONS

This application is based on Italian Patent Application No. 102022000018486 filed on Sep. 12, 2022, the contents of which are incorporated herein by way of reference.

TECHNICAL FIELD

The present invention generally relates to slide fasteners. Particularly, the present invention relates to a fastener element with a decoration bearing portion.

BACKGROUND

As known, a slide fastener (or zipper) comprises a pair of tapes laid flat. The fastener tapes each have inner facing edges where commonly cords are formed and fastener elements (or teeth) are attached to the cords and the inner edges of the fastener tapes. When the edges are drawn closer to each other by the action of a slider on the respective elements, these elements are forced to interdigitate with each other. Tapes with elements attached in this manner are known as stringers. When two stringers are combined together, they are known as a chain. A slide fastener generally comprises a chain, at least one slider, and in many cases a top stop, a bottom stop or both are also attached to the chain. When a slide fastener is to be opened or closed, the user normally takes hold of a pull-tab linked to the slider and pulls the slider forward or backwards. This will close or open the slide fastener, depending on the direction of travel of the slider.

With metal fastener elements made by die casting, each fastener element has, prior to its attachment to a tape, an overall V-shape. Each fastener element has a head portion with two sides opposing each other in the lengthwise direction and between these two sides commences a bifurcation resulting in two legs which extend in the same plane from the head portion so that a gap is formed between the legs. Together the legs are intended to be clamped so as to grip the cord and an inner edge portion of a relevant tape inserted in the gap between the legs. On attachment, the fastener element is clamped over a cord and an inner edge portion of one of the fastener tapes to remain attached thereto, forming a stringer.

In the mounted condition, when clamped to the tapes, the head portions of the elements protrude from the cord towards the opposite stringer. A coupling portion protrudes in the lengthwise direction from one side or both sides of the head portion, depending on the design of the element. A one-sided element has a coupling protrusion on one side, and a receiving area, in the form of a groove or other recess, on the opposite side, for receiving the coupling protrusion of a neighboring element on the cooperating stringer when the zipper is closed and the elements on two stringers mesh together. A double-sided element has on each of its two opposite sides, a coupling protrusion and an adjacent receiving area.

There is demand in the industry for slide fasteners in which the fastener elements bear a decoration at least on those of their surfaces that are visible in use.

Patent Literature 1 discloses a zipper element having a decoration part on it. With a plurality of such elements meshing with each other, a decorative zipper is obtained.

Patent Literature 1: CN107373914A

Some zipper elements known in the prior art have a decorative part directly placed on one of its legs or partly overlapping a meshing area where the legs bifurcate. This arrangement causes problems in the pressing step during the element-crimping process. With this conventional design, the legs need to be pressed inwardly to be attached to the cord and tape with a very high force. The high force applied is likely to produce one or more cracks on the outer surfaces of the element which may be visible on any decoration.

Another problem encountered in the prior art with decorated zippers is the cost for the molds. When it is desired to redesign a decoration part of a zipper element, the entire mold for manufacturing the element and its decoration part needs to be redesigned, which involves high costs.

SUMMARY

According to an aspect, the present invention discloses a fastener element for a slide fastener, the element having, in an initially undeformed condition prior to being attached to a tape, an overall V-shape, the element including:
  a head portion with at least two opposite first and second sides in a given direction, the head portion forming at least one coupling protrusion protruding in the given direction from at least the first side of the head portion, and at least one receiving area formed on at least the second side of the head portion opposite the first side and configured for receiving, in a closed condition of the slide fastener, a coupling protrusion of an adjacent fastener element attached to an opposite stringer of the slide fastener;
  a first leg and a second leg which extend from the head portion and are adapted to be clamped over a cord or an edge of a fastener tape or both, to remain attached thereto and to cooperate in the formation of a stringer, each leg forming a respective proximal portion where each leg joins the head portion, and a distal portion, farther from the head portion and extending away from the proximal portion to a free end of the respective leg;
  a decoration bearing portion formed with the second leg on an outer side thereof facing away from the first leg; and
  a connecting portion located on the distal portion of the second leg and integrally connecting the decoration bearing portion to the second leg.

Embodiments may provide that the decoration bearing portion extends along and beyond the connecting portion, forming a gap that separates the decoration bearing portion from the proximal portion of the second leg.

According to another aspect, the present invention provides a fastener stringer including:
  a slide fastener tape;
  a cord attached along one edge of the slide fastener tape; and
  a row of slide fastener elements as defined in the appended claims, clamped along the cord or one side edge portion of the fastener tape or both.

According to a further aspect, the present invention provides a mold assembly for manufacturing a fastener element.

BRIEF DESCRIPTION OF DRAWINGS

Exemplary embodiments of a slide fastener element according to the present invention will now be described with reference to the accompanying drawings, in which:

FIGS. 4 to 6 are perspective views of a fastener element according to another embodiment of the present invention;

FIG. 7 is a perspective view of a fastener element according to a further embodiment of the present invention;

FIGS. 8 and 9 are perspective views of two slide fastener chains having two different slide fastener elements in accordance with two different embodiments of the present invention.

DESCRIPTION OF EMBODIMENTS

Figure 1:
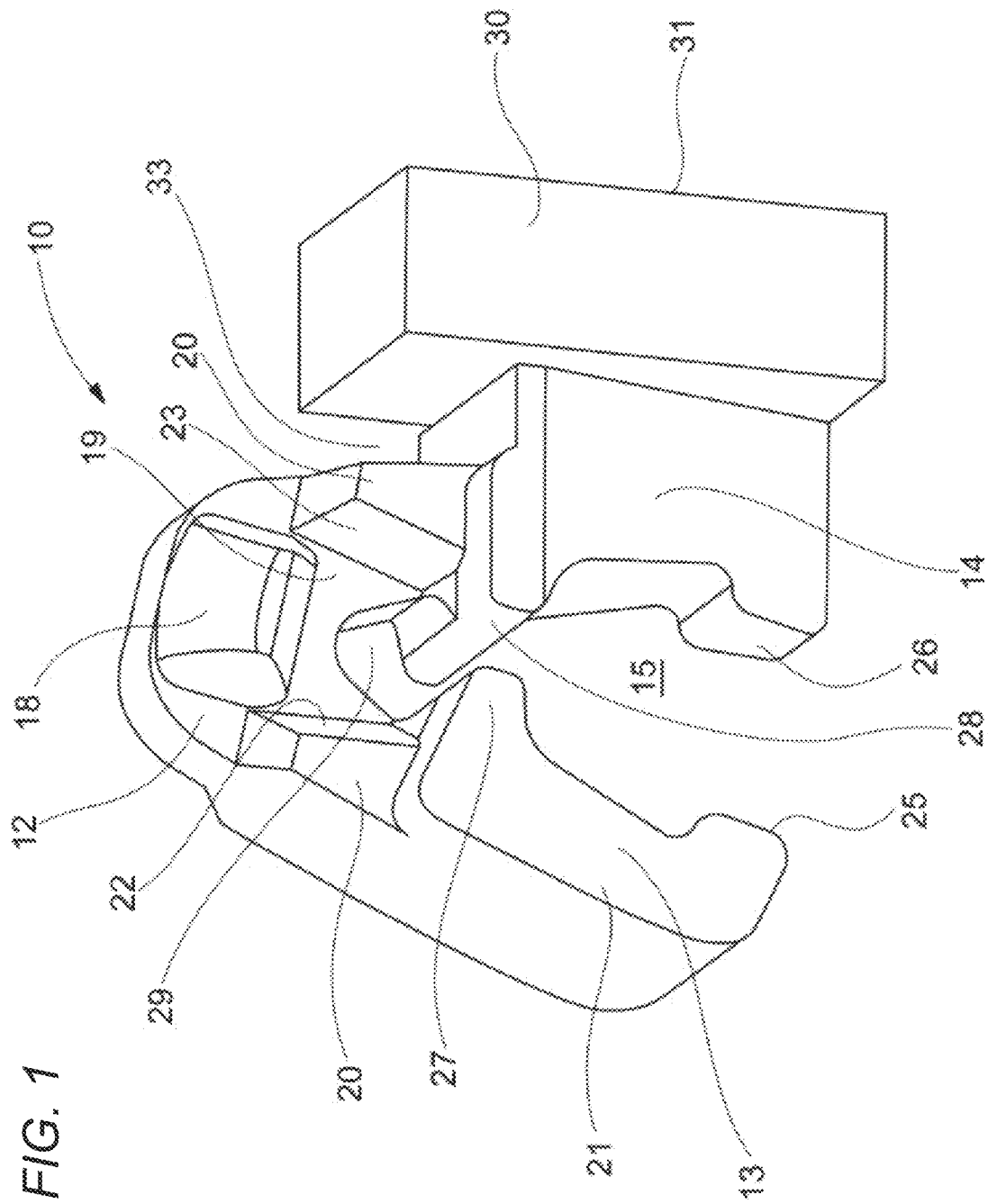
FIG. 1 is a perspective view of a slide fastener element according to a first embodiment of the present invention in an initially undeformed open condition, before being attached to a tape to form a fastener stringer.

Referring to the drawings, a fastener element for a slide fastener tape is designated at 10. The fastener element 10 is preferably manufactured by mold injection although other methods are possible (3D printing, for example), and may typically be made of metal alloy preferably by die-casting. Alternatively, the mold injected fastener element may be made of resin.

As shown in FIG. 1, the fastener element 10 has, in its initially undeformed condition prior to being attached to a tape, an overall V-shape.

Throughout this disclosure, the term "lengthwise" designates the direction in which the fastener tape extends and the direction of movement of a slider (not shown) along the slide fastener. A direction that lies on the surfaces of the fastener tapes and perpendicular to the lengthwise direction is defined as the "transversal" direction or the "width" direction. Terms such as "front", "forward" or "headward" and "back", "tailward" or "rear" refer to the direction in which a slider is relatively moved with respect to the rows of the fastener elements in order to engage and disengage the rows of the fastener elements. When a slider is drawn along the elements in a "front" "forward" or "headward" direction, the elements are forced to interdigitate and so attach to each other, whereas when the slider moves in a backward, tailward or rear direction, the elements open, that is, become detached from each other. The direction that is perpendicular to the lengthwise and transversal directions is defined as the "vertical" direction. The term "thickness", in this context, will generally refer to a length in the lengthwise direction.

Each fastener element has a head portion 12 with two sides opposing each other in the lengthwise direction, namely a first side and an opposite second side of the head portion 12, and a first leg 13 and a second leg 14 which extend in the same plane bifurcating from the head portion 12 so that a gap 15 is formed between the legs.

Figure 3:
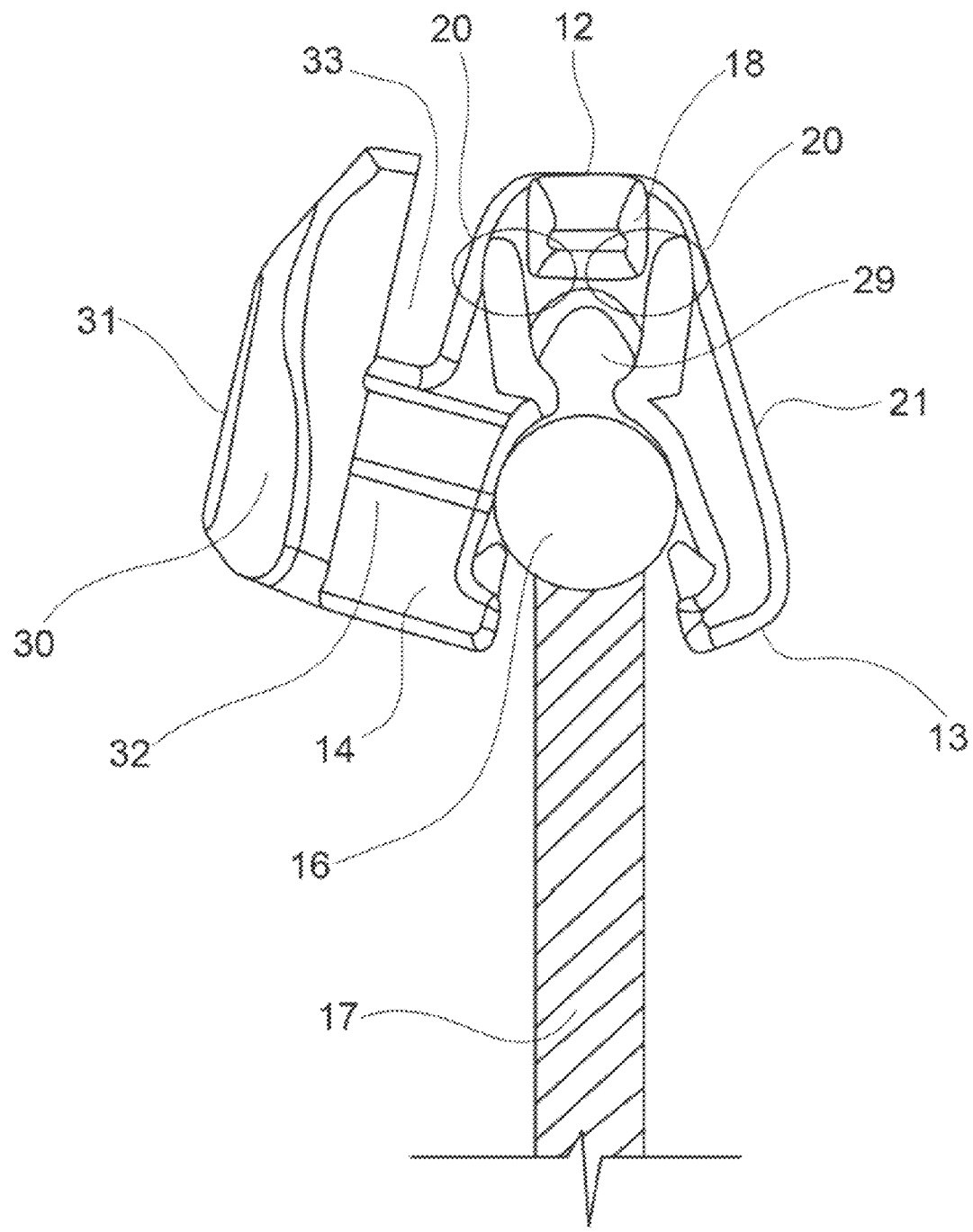
FIG. 3 is a cross-sectional view of a slide fastener element and fastener tape and cord to which the fastener element is to be attached.

Each leg 13, 14 comprises a proximal portion 20 (or root portion), joined to and close to the head portion 12, and a distal portion 21, farther from the head portion 12 and extending away from the proximal portion to the tip or free end of the leg. The legs are intended to be clamped together so as to grip a cord 16 and an inner edge portion of a relevant tape 17 inserted in the gap between the legs (FIG. 3). The cord and the tape extend in a lengthwise direction.

On attachment, a row of fastener elements is clamped over a cord and an inner edge portion of the fastener tape to remain attached thereto, forming a stringer. In the mounted condition, when clamped to the tape, the head portions 12 of the elements protrude from the cord away from the outer edge of the tape, in order to mesh with the head portions of elements protruding from the opposite stringer of the chain.

A coupling portion or protrusion 18 protrudes in the lengthwise direction from at least the first side of the head portion 12. Embodiments may provide that a coupling portion or protrusion 18 protrudes from both the first and the second sides of the head portion 12.

At least one receiving area 19 is formed on at least the second side of the head portion opposite the first side and configured for receiving, in a closed condition of the slide fastener, a coupling protrusion 18 of an adjacent fastener element attached to an opposite stringer of the slide fastener.

The exemplary embodiments shown in the attached drawings all refer to double-sided elements, which have on each of their two opposite (first and second) sides, a coupling protrusion 18 and an adjacent receiving area 19. The receiving area 19 is configured for receiving, in a closed condition of the slide fastener when the elements on two stringers mesh together, a coupling protrusion of an adjacent fastener element attached to an opposite stringer of the slide fastener.

Alternative embodiments (not shown) may refer to one-sided elements, each having on the head portion 12, in the lengthwise direction a coupling protrusion only on one side, and a receiving area, in the form of a groove, indentation or other recess, on the opposite side. The present invention is equally applicable to one-sided elements and double-sided elements.

In the exemplary embodiment illustrated in FIG. 1, the receiving area 19 is provided on each of the two (front and rear) faces of an element 10 facing opposite lengthwise directions. Each receiving area 19 is defined between the coupling protrusion 18 and two side shoulders 22, 23 formed on the proximal portions 20 of the legs.

The proximal portion 20 of the legs 13, 14 are the portions of the legs that are bent during the step of clamping the element 10 on a cord and its relevant tape.

Preferably, the proximal portions 20 of the two legs 13, 14 have a same thickness.

The gap 15 defined between the legs 13, 14 serves as a cord receiving space (FIG. 3). The legs 13, 14 have free ends 25, 26 defining therebetween an entrance to the gap 15 through which the cord is introduced in the unclamped state.

Figure 2:
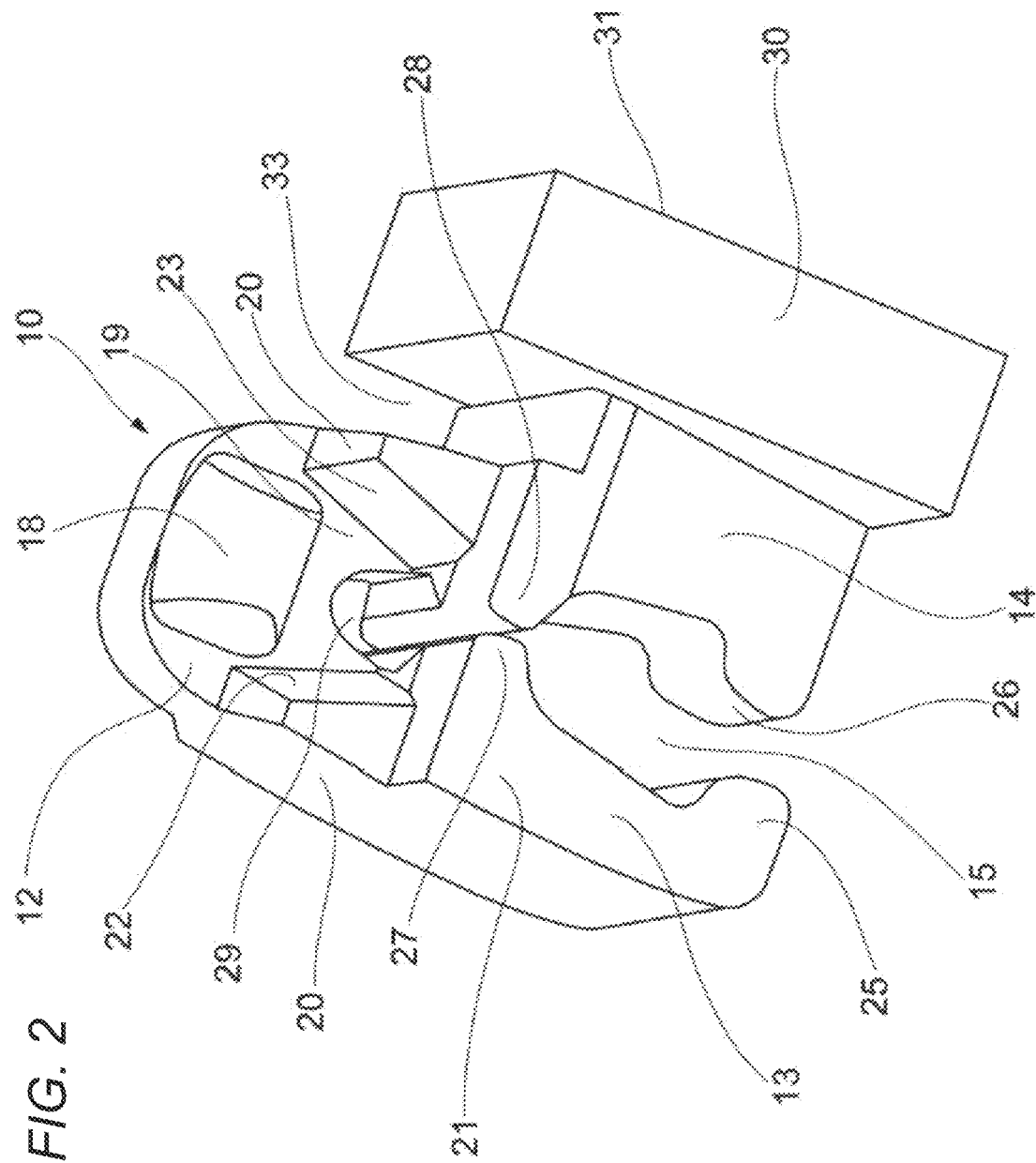
FIG. 2 is a perspective view of the slide fastener element of FIG. 1 in a closed or deformed condition, as it is once attached to a tape to form a fastener stringer, in which the tape is not shown.

As shown in the embodiment of FIGS. 1 to 3, the free ends 25, 26 of the legs 13, 14 may protrude one towards the other, in order to grasp firmly the cord 16 or the tape 17 or both, when attaching the element to its tape.

A side of each leg 13, 14 which faces the other opposing leg is defined as the inner side. The side of a leg opposite the inner side surface is defined as the outer side.

The legs 13, 14 may have mutually facing cord engaging protrusions 27, 28, each extending from an inner side of one leg towards the opposite leg. The cord engaging protrusions 27, 28 are intended to engage and retain a cord of the stringer.

According to other embodiments (not shown), further cord engaging protrusions may extend from the inner surface of each leg towards the opposite leg. Such further protrusions (see, for example WO2022/030564A1, incorporated herein by reference) may be located intermediate the protrusions 25, 27, or 26, 28, to enhance the gripping action on the cord.

Preferably, as in the illustrated embodiments, the cord engaging protrusions 27, 28 define a through hole 29 in the closed condition (FIG. 2) with the proximal portions 20 and the head portion 12. The provision of a through hole 29 enables the transverse length of the legs 13, 14 to be increased because it helps to reduce the deformation of the legs and the formation of cracks on the outer surface of the fastener element due to the clamping action.

A decoration bearing portion 30 is formed with the second leg 14 on an outer side thereof, i.e. a side facing away from the first leg 13. Specifically, the decoration bearing portion 30 is located on the side of the element 10 that will be visible in use and provides an outwardly facing surface 31 intended to form or bear a decoration (not shown). The decoration may be in the form of a representation applied to or provided by the same surface 31, for example one or more layers of paint or other material applied to the surface 31, or a representation engraved or embossed in the surface 31, or an integrally formed decorative feature or comprise a separately formed decorative feature and secured onto the outer surface 31 of the decoration bearing portion 30 or any combination of these or any other methods of decoration.

As in the embodiment illustrated in FIG. 1, the decoration bearing portion 30 may be in the form of a plate, and the surface 31 may be substantially flat. As in the embodiment illustrated in FIGS. 3 to 6, the decoration bearing portion 30 may be curved, and the surface 31 may be shaped to be convex or concave, or variously shaped. The shape and size of the decoration bearing portion may vary according to design requirements.

The decoration bearing portion 30 is connected to the leg 14 by a connecting portion or bridge portion 32 located on the distal portion of the leg 14.

In the illustrated embodiments, the connecting portion 32 extends along the side of the leg 14 from the distal end 26, along the distal portion 21 and does not reach the side of the proximal portion 20 of the leg.

In the illustrated embodiments, the decoration bearing portion 30 extends along and beyond the connecting portion 32 (FIG. 1), forming a gap or slit 33 that separates the decoration bearing portion 30 from the proximal portion 20 of the same leg 14.

According to the embodiment of FIG. 3, the decoration bearing portion 30 extends beyond the connecting portion 32 and has a transversal length corresponding to the transversal length of the entire element 10, i.e. reaches the head portion 12.

Alternative embodiments (not shown) may provide that the decoration bearing portion 30 extends along the connecting portion 32 but not beyond it, whereby no gap or slit is formed between the decoration bearing portion and the proximal portion 20 of the leg 14.

Further alternative embodiments (not shown) may provide that the connecting portion does not commence at the free end 26 but from another point or area on the outer side of the distal portion 21 of the second leg 14.

Other alternative embodiments (not shown) may provide for a gap or slit at the distal end of the element.

Still further alternative embodiments (not shown) may provide for the decoration bearing portion to extend beyond the free end of the second leg 14.

The person skilled in the art will appreciate that further combinations of these and other features will be possible.

If present, the gap 33 should preferably have a vertical width of at least 0.5 mm. In order to manufacture gaps being narrower than 0.5 mmm, a thinner mold part should be used, affecting such mold part's longevity.

Still further embodiments may provide decoration bearing portions 30 being transversally wider than the elements 10, for example extending beyond the head portion 12. Embodiments may provide that the decoration bearing portions are partially staggered and interleaving with the decorations of the elements on the opposing stringer (FIG. 8) both symmetrically and asymmetrically.

Figure 9:
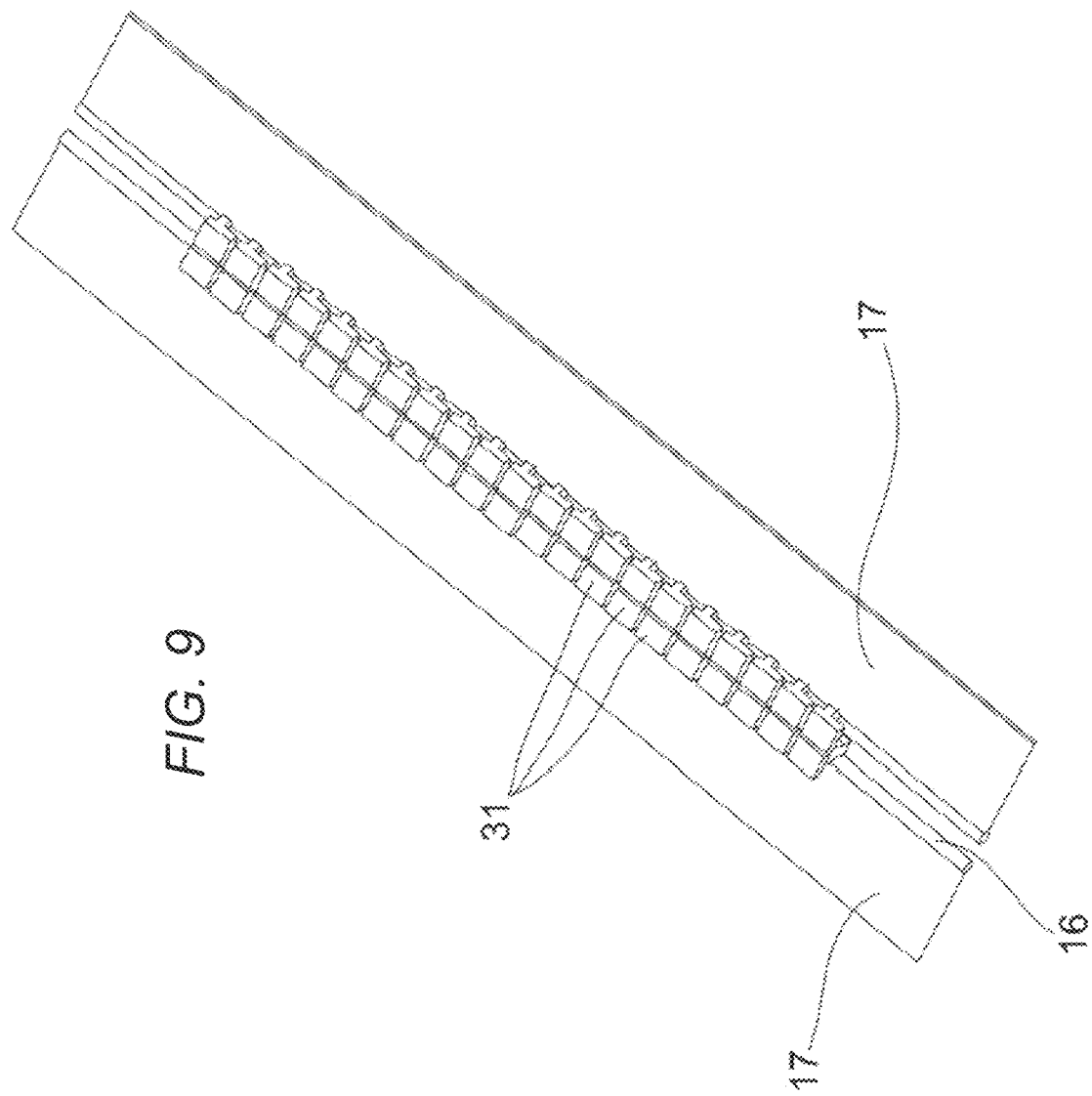

Embodiments (FIG. 9) may provide that decorations, and/or the relevant decoration bearing portions on the left and right stringers of a same chain, have a same transversal width. Further embodiments (not shown) may provide that decorations, and/or the relevant decoration bearing portions on the left and right stringers of a same chain may have different transversal lengths.

After the cord 16 is introduced into the gap 15, the fastener element 10 is clamped onto the cord by deforming the two legs 13, 14 of the fastener element, bringing them nearer to one another. The gap 15 narrows and closes onto the tape 17. The cord engaging protrusions 27, 28 prevent the cord from entering into the through hole 29. Being relatively thicker and stiffer than the proximal portions 20, the distal portions 21 of legs 13, 14 do not bend noticeably during the clamping step. The bending stress and deformation are concentrated and taken almost entirely in the region of proximal portions 20 where the legs join the head portion 12. In this manner, stress is prevented from concentrating on the outer surface of the leg proximal the connecting and the proximal portion.

Advantageously, since the thicknesses of the proximal portions 20 does not differ significantly from the thickness of a conventional element not having a decoration bearing portion, it is not required to apply a higher bending force to clamp the element on the cord and tape.

It will be appreciated that as a result of the gap 33 between the decoration bearing portion 30 and the proximal portion 20, no meaningful deformation will occur on the decoration bearing portion 30 and particularly on its outer surface 31. Therefore, the outer surface 31 will not be damaged and neither will any decoration that may have already been applied thereupon.

The free ends 25, 26 of the two legs may be asymmetric from one another, i.e. having different lengths in the lengthwise direction. Particularly, and mainly for aesthetic purposes, the free end 26 of the leg 14 may have a shorter lengthwise length than the opposite free end 25, in order to be concealed by the decoration bearing portion 30 when viewed by an observer looking from the side of the decoration bearing portion 30.

Figure 10:
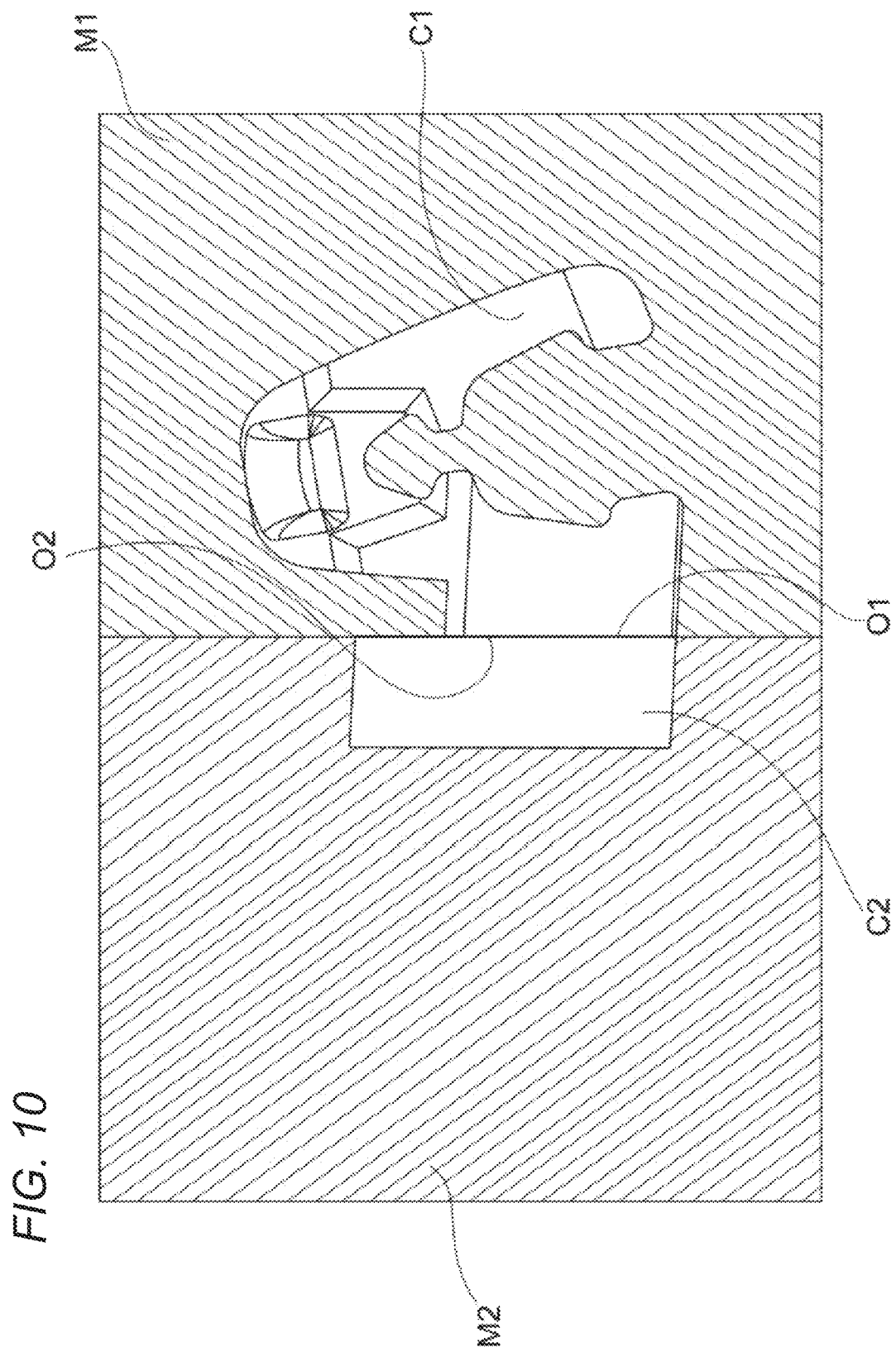
FIG. 10 is a schematic cross-sectional view of a mold assembly for injection molding slide fastener elements according to the present invention.

Advantageously, for manufacturing a fastener element 10, a mold assembly comprised of two complementary molds may be employed (FIG. 10): a first mold M1 having a first molding chamber C1 for casting the functional parts of the element, namely the head 12, the legs 13, 14 and optionally also the connecting portion 32 or parts thereof; a second, interchangeable mold M2, or design mold, which is separable form the first mold M1 and forms a second molding chamber C2 for casting the decoration bearing portion 30, and optionally also the connecting portion 32 or parts thereof.

The two molding chambers each have a relevant side opening O1, O2, respectively configured for establishing fluid communication with the adapted side opening of the opposite mold when the first and second molds are coupled together.

When it is desired to manufacture an element having a different decoration, and therefore a different decoration bearing portion, the entire mold does not need to be changed or redesigned, but only the second interchangeable mold M2 needs to be replaced with another design mold M2 of different design, while still using the first mold M1 for the functional parts of the fastener element. A plurality of interchangeable design molds M2, each having a different shaped chamber C2 may be provided in order to manufacture a corresponding plurality of differently shaped decoration bearing portions of fastener elements all having equally shaped legs and head portions.

A number of aspects and embodiments of a slide fastener element and a slide fastener stringer have been described. It is to be understood that each aspect and embodiment may be combined with any other aspect or embodiment. Particularly, it will be appreciated that the features described and illustrated herein in connection with the embodiments of a fastener element attached to a fastener tape may equally apply to corresponding embodiments of a fastener element in an undeformed state prior to bending its proximal portion and attaching it to the tape. Moreover, the invention is not restricted to the described embodiments, but may be varied within the scope of the accompanying claims and their legal equivalents.

What is claimed is:

1. A fastener element for a slide fastener, the element having, in an initially undeformed condition prior to being attached to a tape, an overall V-shape, the element comprising:
    a head portion with at least two opposite first and second sides in a given direction, the head portion forming at least one coupling protrusion protruding in the given direction from at least the first side of the head portion, and at least one receiving area formed on at least the second side of the head portion opposite the first side and configured for receiving, in a closed condition of the slide fastener, a coupling protrusion of an adjacent fastener element attached to an opposite stringer of the slide fastener;
    a first leg and a second leg which extend from the head portion and are adapted to be clamped over a cord or an edge of a fastener tape or both, to remain attached thereto and to cooperate in the formation of a stringer, each leg forming a respective proximal portion where each leg joins the head portion, and a distal portion, farther from the head portion and extending away from the proximal portion to a free end of the respective leg;
    a decoration bearing portion formed with the second leg on an outer side thereof facing away from the first leg; and
    a connecting portion located on the distal portion of the second leg and integrally connecting the decoration bearing portion to the second leg.

2. The fastener element according to claim 1, wherein the decoration bearing portion extends along and beyond the connecting portion, forming a gap that separates the decoration bearing portion from the proximal portion of the second leg.

3. The fastener element according to claim 2, wherein the gap has a transversal width of at least 0.5 mm.

4. The fastener element according to claim 1, wherein the decoration bearing portion extends along but not beyond the connecting portion.

5. The fastener element according to claim 1, wherein the proximal portions of the two legs have a same thickness.

6. The fastener element according to claim 1, wherein the first and second legs each form free distal ends extending one towards the other.

7. The fastener element according to claim 6, wherein the free distal ends of the two legs have different lengthwise lengths.

8. The fastener element according to claim 6, wherein the free distal end of the second leg has a shorter lengthwise length than the free distal end of the first legs.

9. The fastener element according to claim 1, wherein the legs provide mutually facing cord engaging protrusions extending towards one another, whereby the cord engaging protrusions define a through hole with the proximal portions of the two legs and the head portion when the fastener element is attached to a cord and a tape, forming a stringer.

10. A fastener stringer comprising:
    a slide fastener tape;
    a cord attached along one edge of the slide fastener tape; and
    a row of slide fastener elements according to claim 1, clamped along the cord or one side edge portion of the fastener tape or both.

11. A mold assembly for manufacturing the fastener element according to claim 1, the mold assembly comprising at least two complementary molds:
    a first mold forming a first molding chamber for casting at least the head portion, and the legs of the fastener element; and
    a second, interchangeable mold separable from the first mold and forming a second molding chamber for casting at least the decoration bearing portion of the fastener element,
    wherein the two molding chambers each have a relevant side opening configured for establishing fluid communication with the opening of the opposite mold.

* * * * *